United States Patent
Koizumi et al.

[11] Patent Number: 5,576,368
[45] Date of Patent: Nov. 19, 1996

[54] STEERING WHEEL PAD MOLDED OF A SOFT VINYL CHLORIDE RESIN COMPOSITION

[75] Inventors: Junji Koizumi; Tsugunori Sugiura, both of Inazawa, Japan

[73] Assignee: Toyoda Gosei Co., Ltd., Japan

[21] Appl. No.: 396,088

[22] Filed: Feb. 28, 1995

Related U.S. Application Data

[63] Continuation of Ser. No. 147,433, Nov. 5, 1993, abandoned, which is a continuation of Ser. No. 887,013, May 22, 1992, abandoned.

[30] Foreign Application Priority Data

May 24, 1991 [JP] Japan .................................. 3-149799
May 24, 1991 [JP] Japan .................................. 3-149800

[51] Int. Cl.⁶ .................................. C08J 3/18; C08K 5/11
[52] U.S. Cl. .......................... 524/297; 524/296; 525/129; 525/131; 280/751
[58] Field of Search ........................ 524/296, 297; 525/129, 131; 280/751

[56] References Cited

U.S. PATENT DOCUMENTS

| | | | |
|---|---|---|---|
| 3,882,191 | 5/1975 | Balatoni | 524/297 |
| 4,148,503 | 4/1979 | Shiratori et al. | 280/731 |
| 4,272,464 | 6/1981 | Asai | 525/129 |
| 4,334,699 | 6/1982 | Patzelt et al. | 280/731 |
| 4,347,338 | 8/1982 | Torii | 525/129 |
| 4,408,026 | 10/1983 | Pusineri | 525/129 |
| 4,451,259 | 5/1984 | Geissler | 524/297 |
| 4,657,542 | 4/1987 | Ohachi | 524/296 |
| 4,666,968 | 5/1987 | Downey | 524/297 |
| 4,761,333 | 8/1988 | Takimoto et al. | 428/327 |
| 4,852,907 | 8/1989 | Shiraki et al. | 280/731 |
| 4,910,242 | 3/1990 | Podola | 525/129 |
| 5,056,814 | 10/1991 | Shiraki et al. | 280/731 |

FOREIGN PATENT DOCUMENTS

| | | |
|---|---|---|
| 52-108454 | 9/1977 | Japan . |
| 53-018656 | 2/1978 | Japan . |
| 60-092345 | 5/1985 | Japan . |
| 03-140348 | 6/1991 | Japan . |

*Primary Examiner*—Paul R. Michl
*Assistant Examiner*—John J. Guarriello
*Attorney, Agent, or Firm*—Cushman Darby & Cushman, L.L.P.

[57] ABSTRACT

Provided is a steering wheel pad made of a soft vinyl chloride resin composition. The soft vinyl chloride resin composition is 100 parts by weight of a vinyl chloride resin, 20 to 150 parts by weight of a thermoplastic aliphatic polyurethane, and 60 to 150 parts by weight of an alkyl phthalic ester having the following chemical formula:

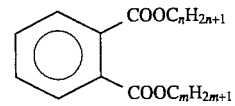

wherein m and n are 7 to 9. The alkyl phtalic ester has a linear chain ratio of an ester group of 80% or more.

7 Claims, 4 Drawing Sheets

STEERING WHEEL PAD MOLDED OF A SOFT VINYL CHLORIDE RESIN COMPOSITION

This is a continuation of application Ser. No. 08/147,433, filed on Nov. 5, 1993 now abandoned, which was abandoned upon the filing hereof which is a FWC of Ser. No. 07/887,013 filed May 22, 1992, now abandoned.

BACKGROUND OF THE INVENTION

1. Field of the Invention

The present invention relates to a soft vinyl chloride resin composition having a wide usable temperature range and excellent heat resistance, low temperature resistance, and long-term durability. The present invention also relates to automobile components such as covers of air bag devices, steering wheel pads, shift lever boots and assist grips, hoses, films, artificial leathers, gaskets and conductor coverings made of this soft vinyl chloride resin composition.

2. Description of the Related Art

Soft vinyl chloride resin is tough and has excellent flame retardancy. Therefore, it has been widely used for automobile components such as covers of air bag devices, steering wheel pads, shift lever boots and assist grips, hoses, films, artificial leathers, gaskets and conductor coverings.

It is required that the soft vinyl chloride resin used for the steering wheel pad have excellent heat resistance, migration resistance and low volatility.

It is also required that the steering wheel pad have a sufficient flexibility without becoming brittle even at low temperatures, for example, about $-40°$ C., as well as the above listed properties of the soft vinyl chloride resin. The energy absorbing mechanisms and the air bag mechanisms recently adopted to a steering wheel pad have an added requirement of enhancing safety.

An approach to improve the properties of the vinyl chloride resin at low temperatures includes adding a plasticizer. It is known that the glass transition temperature (Tg) can be freely controlled depending upon the kind of the plasticizer and the amount of plasticizer. However, to provide enough plasticizer to provide a low temperature flexibility, even at $-40°$ C., will cause problems in the surface stickiness and the heat resistance of the resin, and bleeding and volatility of the plasticizer.

To overcome these problems, it is known that some or all of the plasticizer can be replaced with a thermoplastic elastomer having an excellent low temperature resistance.

Particularly, adding a thermoplastic polyurethane resin has been proposed by, for example, Japanese Unexamined Patent Publications Nos. Sho 55-116747, Sho 52-108454, Sho 53-18656, Sho 60-92345, since the resin has a good compatibility with the vinyl chloride resin.

However, these approaches do not satisfy the requirements for low temperature resistance, the balance between low temperature resistance and heat resistance, the volatility resistance and the bleed resistance. No composition which has a wide usable temperature range and is excellent in both heat resistance and low temperature resistance has yet been discovered.

In view of these points, the present applicant has proposed a soft vinyl chloride resin in which a thermoplastic polyurethane resin and a sebacic acid plasticizer are mixed with a vinyl chloride resin at a given ratio, Japanese Patent Application No. Hei 1-279455.

The soft vinyl chloride resin has the following problems. The soft vinyl chloride resin has a peak temperature of tan $\delta$ (loss factor) of not higher than $-15°$ C., which is a measure of the glass transition temperature (Tg). The vinyl chloride resin exhibits no brittle loss of the material, even at $-40°$ C. and has a tensional modulus at higher temperatures. Accordingly, it is excellent in physical properties such as flexibility and modulus in a wide range from a low temperature of $-40°$ C. to a high temperature of $100°$ C. in comparison with conventional soft vinyl chloride resins.

However, since this resin has a high volatility weight loss on thermal aging, it cannot be applied for functional components such as steering wheel pads requiring high demands for durability and heat resistance.

SUMMARY OF THE INVENTION

The present invention overcomes the above-mentioned problems. It is an object of the present invention to provide a soft vinyl chloride resin component having flexibility and long-term service durability properties such as heat resistance, thermal aging resistance and resistance to light in a usable temperature range from $-40°$ C. to $100°$ C.

Another object of the present invention is to provide automobile components such as covers of air bag devices, steering wheel pads, shift lever boots and assist grips, hoses, films, artificial leathers, gaskets and conductor coverings molded from the resin composition.

In order to accomplish the above-mentioned objects, the present invention provides a soft vinyl chloride resin composition comprising 100 parts by weight of a vinyl chloride resin; 20 to 150 parts by weight of a thermoplastic polyurethane; and 60 to 150 parts by weight of an alkyl phthalic ester having the following chemical formula:

wherein m and n are 7 to 14.

The present invention further provides automobile components such as covers of air bag devices, steering wheel pads, shift lever boots and assist grips, hoses, films, artificial leathers, gaskets and conductor coverings formed of a soft vinyl chloride resin composition comprising 100 parts by weight of a vinyl chloride resin; 20 to 150 parts by weight of a thermoplastic polyurethane; and 60 to 150 parts by weight of an alkyl phthalic ester having the following chemical formula:

wherein m and n are 7 to 14.

DETAILED DESCRIPTION OF THE PREFERRED EMBODIMENTS

In the present invention, vinyl chloride resin having an average polymerization degree of, for example, 700 to 2500 is used. If the average polymerization degree is less than 700, the vinyl chloride resin is so poor in mixing ability and dispersability that flow marks occur when molding. If the average polymerization degree exceeds 2500, shrinkage of the molded article becomes high.

The vinyl chloride resin can be used in combination with a cross-linked resin or a resin having a low polymerization degree.

A thermoplastic polyurethane which is made from polyester diol and isocyanate is used. The carboxylic acid component of polyester diol can include adipic acid, succinic acid, azelaic acid, sebacic acid, etc. The isocyanate can include p-phenylene diisocyanate, diphenylmethane diisocyanate, hexamethylene diisocyanate, tetramethylene diisocyanate, etc. Among them, particularly aliphatic thermoplastic polyurethane made of adipic acid-1,4 butanediol and hexamethylene diisocyanate is preferable since it exhibits little color change due to exposure to light and has excellent thermal aging resistance.

20 to 150 parts by weight of the thermoplastic polyurethane is blended with 100 parts by weight of the vinyl chloride resin. If the thermoplastic polyurethane is less than 20 parts by weight, the peak temperature of the tan δ cannot be sufficiently shifted. If the thermoplastic polyurethane exceeds 150 parts by weight, the amount of the plasticizer to be added to adjust hardness increases. As a result, the difference in viscosity between the vinyl chloride and the thermoplastic polyurethane increases. Accordingly, the dispersion properties of the thermoplastic polyurethane decreases.

The alkyl phthalic ester (hereinafter APE) is a plasticizer. The APE having the above-mentioned chemical structure wherein m and n are 7 to 14 is used. The APE in which m and n are 7 is dihexyl phthalate and the APE in which n and m are 8 is dioctyl phthalate. The APE in which m and n are 7 to 9 is preferable since the APE in which m and n are 10 or more causes bleeding on exposure to light.

It is preferable that the percentage of the linear chains of the ester groups (normal structure) in the APE be 80% or more.

60 to 150 parts by weight of the plasticizer is blended with 100 parts by weight of the vinyl chloride. If less than 60 parts by weight of the plasticizer is blended, the hardness of the molded article becomes high and the flexibility becomes poor. If the plasticizer exceeds 150 parts by weight, the hardness of the molded article becomes low and bleeding occurs resulting in poor practicability.

A filler can be added to the composition. It is preferable that such filler be a plate-like material such as talc, mica, calcined clay, or caoline clay. The filler can improve the heat resistance and prevent the molded article from deforming at higher temperatures.

10 to 100 parts by weight of filler is blended to 100 parts by weight of the vinyl chloride resin. If the filler is less than 10 parts by weight, the mechanical properties of the molded article, such as the modulus are low and the post-molding shrinkage increases. If the filler exceeds 100 parts by weight, the physical properties of the molded article such as tensional modulus and elongation are low and the molding properties become poor.

The thermoplastic polyurethane is uniformly dispersed by mixing a given amount of the thermoplastic polyurethane with a specific soft vinyl chloride resin so that the inherent mechanical properties of the soft vinyl chloride resin are effectively combined with the mechanical properties the thermoplastic polyurethane possesses, such as toughness, modulus and excellent low temperature resistance.

As a result, the tan δ peak temperature of the present composition is lowered below −10° C. The softness of the material is retained, even at −40° C., and the modulus is maintained so that it is not less than a given value, even at high temperatures, such as 100° C.

Moreover, the composition of the present invention does not change its color on exposure to heat or light when the aliphatic thermoplastic polyurethane is used.

Use of the thermoplastic polyurethane with a given plasticizer provides an enhanced effect in the balance between the low-temperature resistance (glass transition temperature) and the heat resistance (modulus at high temperature).

The low-temperature resistance is generally reciprocal to the heat resistance. They have a negative relationship in that the heat resistance is lowered as the low-temperature resistance is improved. This relationship can be considerably improved by blending the thermoplastic polyurethane in the soft vinyl chloride resin, as mentioned above. Particularly, if alkyl phthalic ester having a ratio of 80 to 100% linear chain is applied as a plasticizer, a composition which is excellent in balanced characteristics, and having the required cold-temperature resistance and heat resistance, which are not anticipated by the prior art, is obtained.

If m and n, which represent the molecular weight of the plasticizer, are 7 to 9, a composition which is excellent in long-term durability performance, such as thermal aging resistance and resistance to light exposure, as well as the balanced characteristics between the low-temperature resistance and heat resistance, is obtained.

An enhanced effect is obtained in the relationship between the low-temperature resistance and the heat resistance which is related to the compatibility among the vinyl chloride resin, the plasticizer and the thermoplastic polyurethane resin.

Although definite reasons are not clear yet, when the plasticizer is used, the compatibility between the uniform vinyl chloride resin/plasticizer mixture becomes optimum so that the thermoplastic polyurethane is uniformly mixed and finely dispersed in the mixture.

As mentioned above, a soft vinyl chloride resin composition which is excellent in low-temperature resistance, heat resistance and long-term durability is provided. Moreover, a soft vinyl chloride resin composition which is excellent in heat resistance and low-temperature resistance and can be used where the environmental temperature changes are large (for example −40° C. to 100° C.) is provided.

Therefore, automobile components such as covers of air bag devices, steering wheel pads, shift lever boots and assist grips, hoses, films, artificial leathers, gaskets and conductor coverings of the present invention have an excellent heat resistance in which the modulus is maintained at a given value at a high temperature, for example, 100° C. while they have a glass transition point which is at a low temperature, below −40° C. so that the usable temperature range is widened, and they have good thermal aging resistance.

EXAMPLES AND COMPARATIVE EXAMPLES

Examples and Comparative Examples of the present invention will be described.

Loading ratios (parts by weight) of components in each Example, and the result of measurements of the hardness, the tensile strength, the tensile elongation, the tan δ peak temperature (measure of glass transition point Tg) of various components at room temperature, the tensional modulus at 100° C. (the value of dyne per 1 cm$^2$) and the resistance to light are shown in Tables 1 to 4.

The measurements of the tensional modulus, etc. are averaged values of the several measurements which were obtained by using test pieces (2×5×50 mm). The resistance to light was measured after exposure for 400 hours at 83° C. in a fade test. The heat resistance was measured by observing the appearance of test pieces after thermal treating for 500 hours at 80° C.

In Tables 1 to 4, PVC and TPU represent vinyl chloride resin and thermoplastic polyurethane, respectively.

In all Examples other than Examples 11 and 12, and in the Comparative Examples, PVC equivalent to that having an average polymerization degree of 1300 was used, and 100 parts by weight of PVC was loaded.

In Examples other than Examples 1 to 6, and in Comparative Examples other than C3 and C5, 50 parts by weight of the thermoplastic polyurethane was loaded. In C3, the thermoplastic polyurethane was not loaded. In C1, 2, 4, 7 to 10, aliphatic TPU was used. In C6, aromatic TPU in which the polyol component as an ester was used. In C5, aliphatic polyurethane alone was used.

A plasticizer, n-DOP (normal dioctyl phthalate in which m and n are 8 manufactured by Kao K. K.) or trade name Linevol phthalate in which n and m=7 to 9, PL 100 (manufactured by Mitsubishi Gas Chemical K. K.) was used. In Comparative Examples C4, C1 and C2, Linevol phthalate (m, n=9 to 11, PL 200 manufactured by Mitsubishi Gas Chemical K. K.), DOP (manufactured by Toho Rika K. K.) and DBS (dibuthyl-sebacate manufactured by Sanken Kako K. K.) were used, respectively. In C7, DOA (diocthyladipate manufactured by Toho Rika K. K.) was used. In C8, Linevol phthalate (m, n=10 to 14, RH 100 manufacture by Mitsubishi Gas Chemical K. K.) was used. In C9, DIDP (di-isodecyl-phthalate manufactured by Mitsubishi Gas Chemical K. K.) was used. In C10, DNDP (di-n-decyl-phthalate manufactured by Kao K. K.) was used. In C5, no plasticizer was used.

The above-mentioned thermoplastic polyurethane to be loaded was manufactured by heat treating polymerized pellets and thereafter pelletizing the same again. The term "heat treating" used herein means a heat treatment at 180° to 220° C. using an extruder, etc., to bring the thermoplastic polyurethane into transparent condition and thereby enhance the processability on kneading with soft vinyl chloride resin.

The results of the measurements are described below.

Apparent from Tables 1 and 2, the hardness is constant, 66 to 74 (Hs), in Examples other than Example 6, which is a preferable hardness. Example 6, is 80 (Hs), which is slightly higher than preferred.

Apparent from Table 3, the Comparative Example C5 shows 92 (Hs), i.e., soft feeling was lost.

The peak temperature of tan δ is as low as −17° C. to −43° C., Examples 1 to 12. In contrast, the compositions in Comparative Examples C1, C3 and C9 have poor low temperature properties and become brittle since the peak temperature tan δ main dispersion of C1, C3 and C9 is not lower than −10° C.

The tensional modulus at 100° C. is kept 1×10$^7$dyne/cm$^2$, which is a minimum usable strength in every Example. It is preferable that a modulus not lower than 1.5×10$^7$dyne/cm$^2$ be maintained.

The compositions in all the Examples showed good resistance to light while the compositions in Comparative Examples C4, C8 and C10 showed bleeding and low resistance to light.

The compositions in all Examples showed good heat resistance, while the compositions in Comparative Examples C1, C2 and C7 showed a large volatility weight loss and difficulty in serviceability. The reference marks O and X denote good and not good in resistance to light and heat resistance, respectively.

Figure 1:
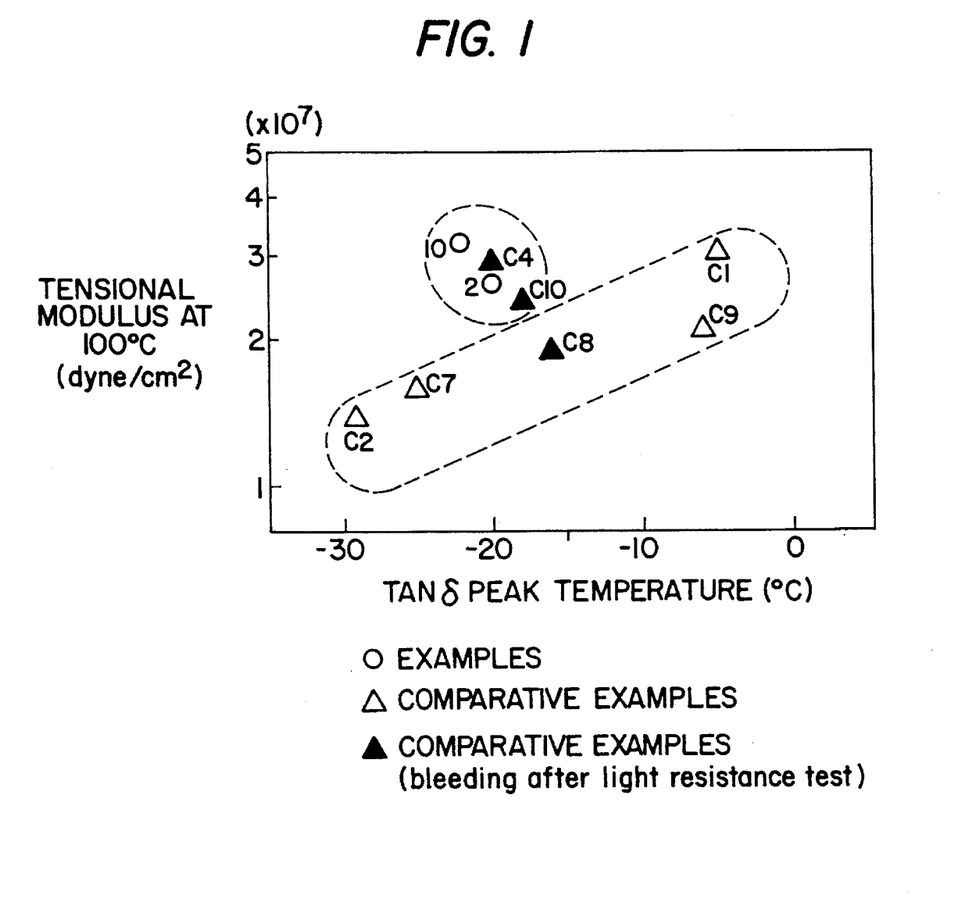
FIG. 1 is a graph showing the relation between the tan $\delta$ peak temperature and the tensional modulus at $100°$ C. in the Examples.

FIG. 1 shows the relationship between the low-temperature resistance (glass transition point) and the heat resistance when the kinds of the plasticizer are changed for blend in which the vinyl chloride resin has a polymerization degree of 1300 and 50 parts by weight of the thermoplastic polyurethane is loaded.

From FIG. 1, the alkyl phthalic ester having a linear chain ratio of 80 to 100% and m and n representing the molecular weights 7 to 11, which are used as plasticizers, are particularly excellent in balance between the low temperature resistance and the heat resistance. Moreover, the alkyl phthalic ester having n and m of 7 to 9 are excellent also in resistance to light.

From the foregoing, a soft vinyl chloride resin composition in which the usable temperature range is widened from −40° C. to 100° C. is provided.

Therefore, a soft vinyl chloride resin component in which the changes in physical properties are relatively less in a wide usable temperature range, and has excellent heat resistance, low temperature resistance, and long-term durability performance is obtained.

TABLE 1

|  | Examples ||||||
| --- | --- | --- | --- | --- | --- | --- |
|  | 1 | 2 | 3 | 4 | 5 | 6 |
| Polymerization degree of PVC resin | 1300 | 1300 | 1300 | 1300 | 1300 | 1300 |
| Amount of PVC (part by weight) | 100 | 100 | 100 | 100 | 100 | 100 |
| Amount of aliphatic TPU (part by weight) | 25 | 50 | 75 | 100 | 100 | 100 |
| Amount of Aromatic TPU (part by weight) | — | — | — | — | — | — |

TABLE 1-continued

|  | Examples | | | | | |
| --- | --- | --- | --- | --- | --- | --- |
|  | 1 | 2 | 3 | 4 | 5 | 6 |
| TPU Polyol Component | adipate | adipate | adipate | adipate | adipate | adipate |
| Kind of plasticizer | n-DOP | n-DOP | n-DOP | n-DOP | n-DOP | n-DOP |
| Amount of plasticizer (part by weight) | 90 | 90 | 90 | 120 | 150 | 60 |
| Linear chain ratio of Ester groups of plasticizer | 100 | 100 | 100 | 100 | 100 | 100 |
| Kind of filler | talc | talc | talc | talc | talc | talc |
| Amount of filler (part by weight) | 30 | 30 | 30 | 30 | 30 | 30 |
| Tensile strength (kg/cm$^2$) | 87 | 104 | 120 | 110 | 85 | 170 |
| Tensile elongation (%) | 300 | 360 | 410 | 500 | 490 | 480 |
| Hardness (HS) | 70 | 71 | 72 | 70 | 66 | 80 |
| Tensional Modulus at 100° C. ($\times 10^7$ dyne/cm$^2$) | 2.2 | 2.6 | 2.9 | 3.4 | 3.3 | 3.7 |
| Tan δ peak temperature (°C.) (Measure of Tg) | −18 | −20 | −22 | −33 | −43 | −17 |
| Resistance to light (at 83° C. for 400 hrs.) | o | o | o | o | o | o |
| Heat Resistance (80° C. × 400 hrs.) | o | o | o | o | o | o |

TABLE 2

|  | Examples | | | | | |
| --- | --- | --- | --- | --- | --- | --- |
|  | 7 | 8 | 9 | 10 | 11 | 12 |
| Polymerization degree of PVC resin | 1300 | 1300 | 1300 | 1300 | 700 | 1800 |
| Amount of PVC (part by weight) | 100 | 100 | 100 | 100 | 100 | 100 |
| Amount of aliphatic TPU (part by weight) | 50 | 50 | 50 | 50 | 50 | 50 |
| Amount of Aromatic TPU (part by weight) | — | — | — | — | — | — |
| TPU Polyol Component | adipate | adipate | adipate | adipate | adipate | adipate |
| Kind of plasticizer | n-DOP | n-DOP | n-DOP | Rinebol Phthalate C7–9 | n-DOP | n-DOP |
| Amount of plasticizer (part by weight) | 90 | 90 | 90 | 90 | 90 | 90 |
| Linear chain ratio of Ester groups of plasticizer | 100 | 100 | 100 | 80 | 100 | 100 |
| Kind of filler | — | calcined clay | Mica | talc | talc | talc |
| Amount of filler (part by weight) | — | 30 | 30 | 30 | 30 | 30 |
| Tensile strength (kg/cm$^2$) | 132 | 116 | 100 | 105 | 74 | 141 |
| Tensile elongation (%) | 430 | 350 | 340 | 370 | 280 | 450 |
| Hardness (HS) | 67 | 71 | 67 | 71 | 68 | 74 |
| Tensional Modulus at 100° C. ($\times 10^7$ dyne/cm$^2$) | 1.5 | 2.3 | 2.0 | 3.2 | 1.5 | 3.2 |
| Tan δ peak temperature (°C.) (Measure of Tg) | −21 | −21 | −21 | −22 | −22 | −21 |
| Resistance to light (at 83° C. for 400 hrs.) | o | o | o | o | o | o |
| Heat Resistance (80° C. × 400 hrs.) | o | o | o | o | o | o |

TABLE 3

|  | Comparative Examples | | | Comparative Example | Comparative Example |
| --- | --- | --- | --- | --- | --- |
|  | C1 | C2 | C3 | C4 | C5 |
| Polymerization degree of PVC resin | 1300 | 1300 | 1300 | 1300 | — |
| Amount of PVC (part by weight) | 100 | 100 | 100 | 100 | — |
| Amount of aliphatic TPU (part by weight) | 50 | 50 | — | 50 | 100 |
| Amount of Aromatic TPU (part by weight) | — | — | — | — | — |
| TPU Polyol Component | adipate | adipate | — | adipate | adipate |
| Kind of plasticizer | DOP | DBS | n-DOP | Rinebol Phthalate C9–11 | — |

TABLE 3-continued

|  | Comparative Examples | | | Comparative Example | Comparative Example |
| --- | --- | --- | --- | --- | --- |
|  | C1 | C2 | C3 | C4 | C5 |
| Amount of plasticizer (part by weight) | 90 | 90 | 90 | 90 | — |
| Linear chain ratio of Ester groups of plasticizer | 0 | 100 | 100 | 80 | — |
| Kind of filler | talc | talc | talc | talc | talc |
| Amount of filler (part by weight) | 30 | 30 | 30 | 30 | — |
| Tensile strength (kg/cm$^2$) | 100 | 95 | 54 | 82 | 400 |
| Tensile elongation (%) | 370 | 430 | 160 | 270 | 550 |
| Hardness (HS) | 71 | 66 | 72 | 72 | 92 |
| Tensional Modulus at 100° C. (× 10$^7$ dyne/cm$^2$) | 3.0 | 1.4 | 1.5 | 2.9 | 5.5 |
| Tan δ peak temperature (C) (Measure of TG) | −5 | −29 | −7 | −20 | −35 |
| Resistance to light (at 83° C. for 400 hr.) | ○ | ○ | ○ | Δ bleeding | ○ |
| Heat Resistance (80° C. × 400 hr.) | x Large valatility weight loss | x Large valatility weight loss | ○ | ○ | ○ |

TABLE 4

|  | Comparative Examples | | Comparative Example | Comparative Examples | |
| --- | --- | --- | --- | --- | --- |
|  | C6 | C7 | C8 | C9 | C10 |
| Polymerization degree of PVC resin | 1300 | 1300 | 1300 | 1300 | 1300 |
| Amount of PVC (part by weight) | 100 | 100 | 100 | 100 | 100 |
| Amount of aliphatic TPU (part by weight) | — | 50 | 50 | 50 | 50 |
| Amount of Aromatic TPU (part by weight) | 50 | — | — | — | — |
| TPU Polyol Component | ether | adipate | adipate | adipate | adipate |
| Kind of plasticizer | n-DOP | DOA | Rinebol Phthalate C$_{11-14}$ | DIDP | DNDP |
| Amount of plasticizer (part by weight) | 90 | 90 | 90 | 90 | 90 |
| Linear chain ratio of Ester groups of plasticizer | 100 | 100 | 100 | 100 | 100 |
| Kind of filler | talc | talc | talc | talc | talc |
| Amount of filler (part by weight) | 30 | 30 | 30 | 30 | 30 |
| Tensile strength (kg/cm$^2$) |  | 125 | 113 | 101 | 92 |
| Tensile elongation (%) |  | 430 | 330 | 330 | 300 |
| Hardness (HS) |  | 71 | 70 | 74 | 73 |
| Tensional Modulus at 100° C. (× 10$^7$ dyne/cm$^2$ |  | 1.6 | 1.9 | 2.1 | 2.4 |
| Tan δ peak temperature (°C.) Measure of TG) |  | −25 | −16 | −6 | −16 |
| Resistance to light (at 83° C. for 400 hr.) |  | ○ | Δ bleeding | ○ | Δ bleeding |
| Heat Resistance (80° C. × 400 hr.) | ○ | x Large volatiling height loss | ○ | ○ | ○ |

A steering wheel pad of the present invention will be described below with reference to FIGS. 2 to 5.

Figure 2:
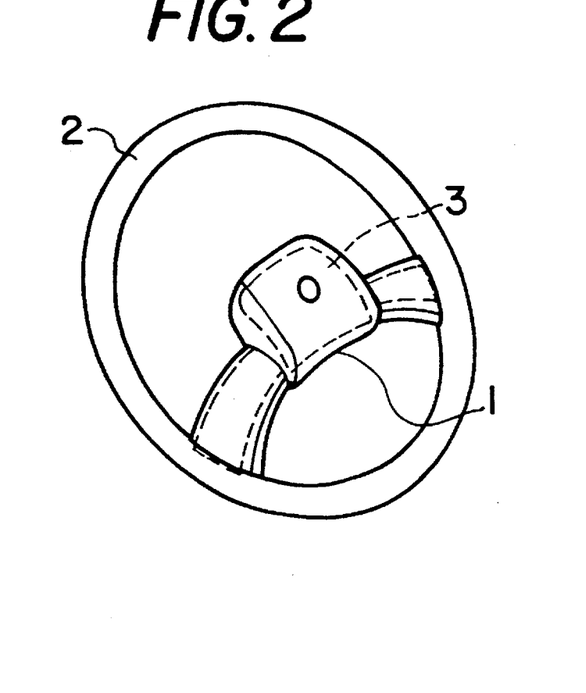
FIG. 2 is a perspective view showing an embodiment of a steering wheel pad.

The steering wheel pad 1 covers a spoke portion 3 disposed within a steering wheel 2, as shown in FIG. 2.

The steering wheel pad 1 is formed of a soft vinyl chloride resin composition comprising 100 parts by weight of vinyl chloride resin, 20 to 150 parts by weight of thermoplastic urethane resin and 60 to 150 parts by weight of alkyl phthalic ester having the following chemical formula.

wherein m and n are 7 to 14.

The physical properties of Examples 13 to 17 and Comparative Examples 6 and 7 set forth in Table 5 were measured. The composition of these Examples are listed in Table 5. The results of measurements of horn actuating load at −40° C., heat resistance and the period of time required for molding, are shown in Table 5.

The results of measurements of physical properties, such as specific weight, hardness and tensile strength of Example 15 and Comparative Examples 6 and 7 are shown in Table 6.

The molding conditions of the steering wheel pad are as follows:

(1) Molding method: Injection molding (2) Molding temperature: 170 to 190° C.

(3) Period of time taken for molding: shown in Table 5.

Figure 3:
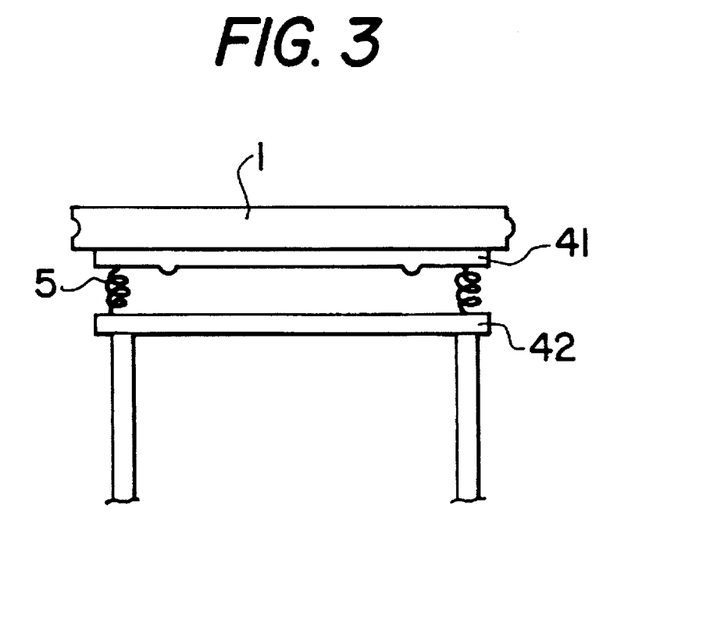
FIG. 3 is a sectional view showing the steering wheel pad in the embodiment.

The horn actuating load was a measured load imposed upon an upper metal plate 41, which is covered with the pad 1, when two metal plates 41 and 42, which are separated by a spring disposed therebetween, are brought into contact with each other as shown in FIG. 3. The heat resistance was a measurement performed by observing the appearance of a sample after treatment for 500 hours at 80° C. The period of time for molding was the period of time (second) required for molding. The measured value of the tensional modulus in Table 6 was an average value of several measurements performed for test pieces (2×5×50 mm). In Table 5, PVC and TPU denote vinyl chloride resin and thermoplastic polyurethane, respectively.

In all Examples, compositions equivalent to PVC having an average polymerization degree of 1300 and containing 100 parts of PVC were used. In Comparative Example 6, commercially available PVC was used for the steering wheel pad. In Comparative Example 7, thermosetting urethane resin was used.

Aromatic thermoplastic polyurethane was used in Example 13. Aliphatic thermoplastic polyurethane was used in Examples other than Example 13. No thermoplastic polyurethane was used in the Comparative Examples.

A plasticizer, n-DOP (normal dioctyl phthalate) in which m and n are 8 (manufactured by Kao K. K.) or a trade name Linevol phthalate (n,m=7 to 9, PL 100 manufactured by Mitsubishi Gas Chemical K. K.) was used.

The above-mentioned thermoplastic polyurethane was made by heat treating polymerized pellets and thereafter pelletizing the same again.

The results of the measurements are described below.

Figure 6:
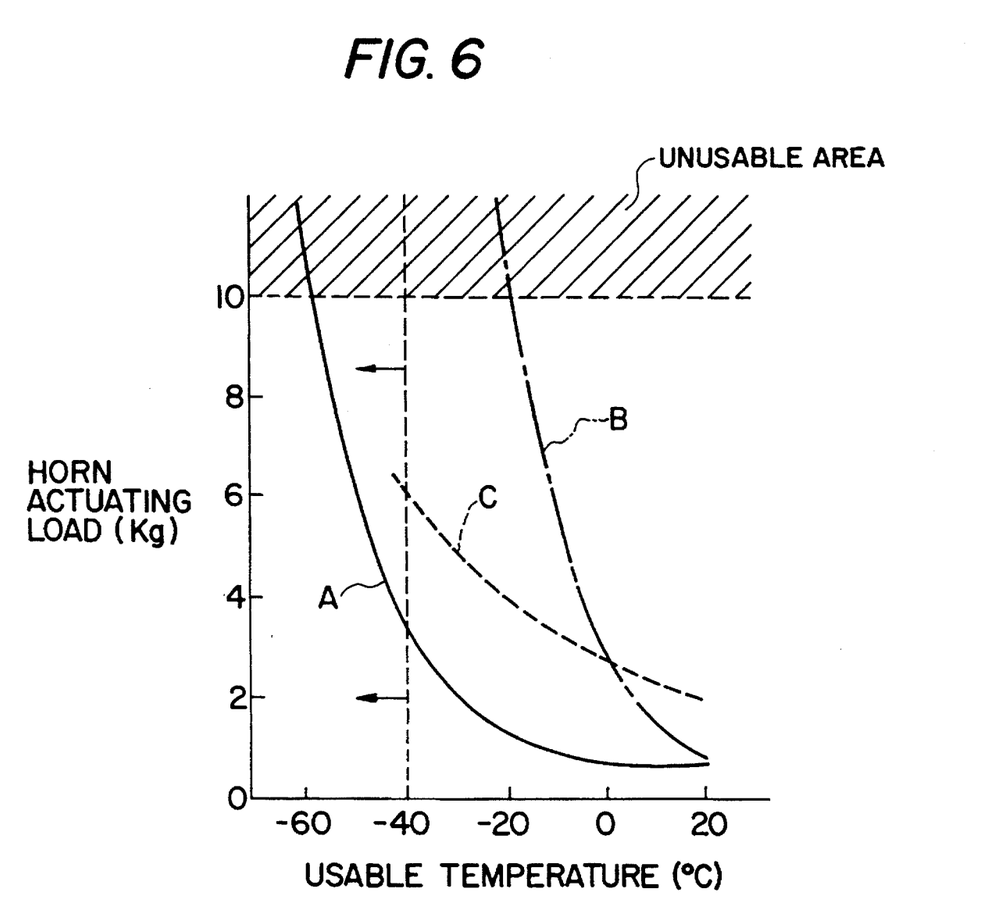
FIG. 6 is a graph showing the relation between the horn actuating load and the usable temperature in the Examples.

Apparent from Table 5, the horn actuating loads at temperatures not higher than −40° C. in Examples 13 to 17 were relatively low, 3 to 5 kg. In contrast, at the same temperature, the loads in Comparative Examples 6 and 7 were relatively high, 6 to 20 kg. As shown in FIG. 6, the steering wheel pad can not be used when the load exceeds 10 kg.

From Table 6, the horn actuating load at temperatures not higher than 20° C. in Example 15 was good, 0.9 kg.

The reference mark, 0, in Table 5 denotes that the durability and heat resistance were good.

In Table 5, the periods of time taken for molding was a relatively short 50 seconds, in any of Examples 13 to 17 and Comparative Example 6. In contrast to this, a long period of time, 120 seconds, was taken in Comparative Example 7 since thermoplastic urethane resin was used.

The specific weight and the hardness (HS) are preferably values of 1.22 and 71 degrees, respectively, as in Example 15 of Table 6. The specific weight and the hardness were 1.31 and 70 degrees, respectively, in Comparative Example 6. The specific weight and the hardness are 0.6 to 0.7 and 60 to 70 degrees, respectively, in Comparative Example 7.

In Table 6, the tensile strength was 104 kg/cm$^2$ in Example 15, while it was a low 40 kg/cm$^2$ in Comparative Example 7. The tensile strength was 85 kg/cm$^2$ in Comparative Example 6, which was the same as that in Example 15.

From Table 6, the tensile break elongation was 360% in Example 15, while it was considerably low, 80 to 110%, in Comparative Example 7.

Also from Table 6, the peak temperature of tan δ, was −20° C. in Example 15, while it was considerably high, 0° C, in Comparative Example 6. The peak temperature was low, −50° C. in Comparative Example 7 since thermosetting urethane resin was used.

The tensional modulus at a high temperature (100° C.) was 2.6×10$^7$ dyne/cm$^2$ in Example 15, while it was 1×10$^7$ to 4×10$^7$ dyne/cm$^2$ in Comparative Example 6 and 7. The horn actuating loads were good in all Examples, except Comparative Example 6, in which the load at temperatures not higher than 40° C. was not higher than 20 kg.

There was no problem in change in appearance in all Examples and Comparative Examples. Reference marks O and X in Tables 5 and 6 denote good and not good, respectively.

Figure 4:
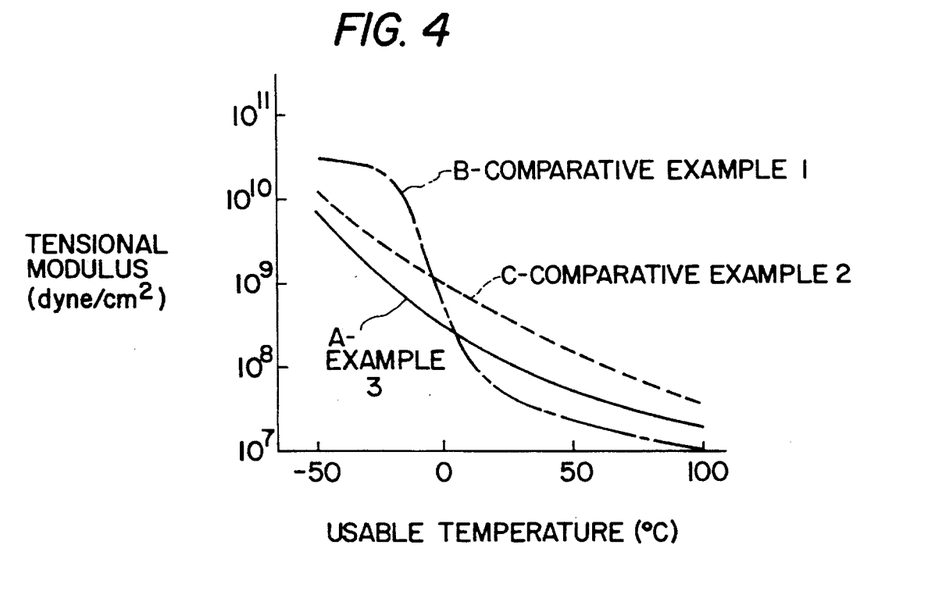
FIG. 4 is a graph showing the relation between the tensional modulus and the usable temperature in Examples.

The above-mentioned results are shown in FIGS. 4 and 6. FIG. 4 shows the relation between the tensional modulus and the usable temperature. From FIG. 4, Example 15 (curve A) has very low temperature dependency of the tensional modulus in comparison with Comparative Example 6 (curve B).

Figure 5:
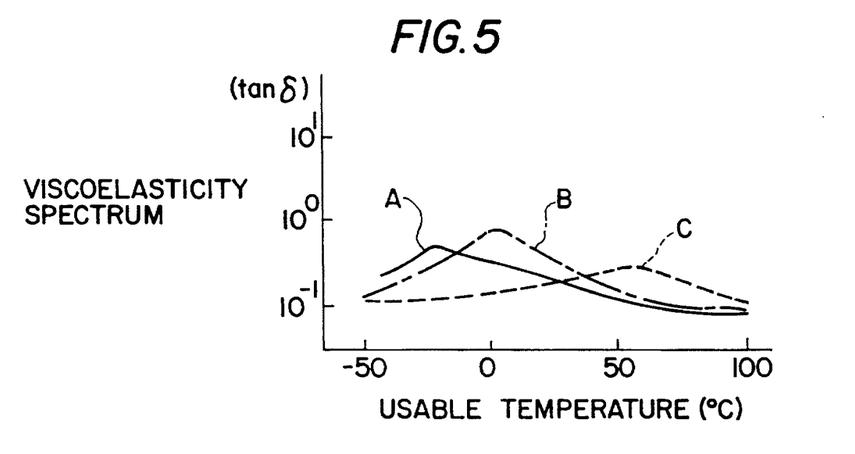
FIG. 5 is a graph showing the relation between the viscoelasticity spectrum (tan δ) and the usable temperature in the Examples.

FIG. 5 shows the relation between the viscoelasticity spectrum (tan δ) and the usable temperature. The tan δ (a measure of Tg) increases at low temperature, in Example 15 (curve A), while there is a peak in the higher temperature area in Comparative Example 6 and 7 (curves B and C).

FIG. 6 shows the relation between the horn actuating load and the usable temperature. In FIG. 6, the load increases at a low temperature area in Example 15 (curve A). The composition of Example 15 becomes practically unusable at about −50° C. In Comparative Example 6, the load becomes higher at temperatures not higher than 0° C., and the composition becomes practically unusable at about −15° C. In Comparative Example 7, the load gradually increases at a low temperature area.

From the foregoing, a steering wheel pad made of a soft vinyl chloride resin composition in which the usable temperature range is widened from—40° C. to 100° C. and which is excellent in thermal aging resistance, is obtained.

TABLE 5

| Compositions and Physical Properties | | Comparative Examples | | EXAMPLES | | | | |
| --- | --- | --- | --- | --- | --- | --- | --- | --- |
| | | 6 | 7 | 13 | 14 | 15 | 16 | 17 |
| PVC | | 100 | — | 100 | 100 | 100 | 100 | 100 |
| Plasticizer | Rinebol Phthalate | — | — | 90 | — | — | — | — |
| | Polyester | 90 | — | — | — | — | — | — |
| | n-DOP | — | — | — | 90 | 90 | 90 | 90 |
| TPU | Aromatic | — | — | 50 | — | — | — | — |
| | Aliphatic | — | — | — | 25 | 50 | 75 | 50 |
| | Filler | 30 | — | 30 | 30 | 30 | 30 | — |
| Thermosetting urethane resin | | — | 100 | — | — | — | — | — |
| Horn actuating load at −40° C. (kg) | | >20 | 6 | 5 | 5 | 4 | 3 | 4 |
| Durability and Heat Resistance (80° C. × 500 hr) | | 0 | 0 | 0 | 0 | 0 | 0 | 0 |
| Period of time taken for molding (sec.) | | 50 | 120 | 50 | 50 | 50 | 50 | 50 |

TABLE 6

| Items | Units | Example 15 | Comparative Example 6 | Comparative Example 7 |
| --- | --- | --- | --- | --- |
| Specific weight | — | 1.22 | 1.31 | 0.6–0.7 |
| Hardness | (Hs) | 71 | 70 | 60–70 |
| Tensil Strength | (kg/cm$^2$) | 104 | 85 | 40 |
| Tensile Break Ts Longation | (%) | 360 | 240 | 80–110 |
| Ts tan δ peak temperature | (°C.) | −20 | 0 | <−50 |
| Shape of samples | — | broad | sharp | broad |
| Tensional modulus | (dyne/cm$^2$) at 100° C. | $2.6 \times 10^7$ | $1 \times 10^7$ | $4 \times 10^7$ |
| Horn actuating | 20° C. (kg) | o (0.9) | o (0.8) | o (2) |
| load | −40° C. (kg) | o (4) | x (>20) | o (6) |
| Change in appearance | (80° C. × 500) Durability and heat resistance (after 80° × 500 hr) | o | o | o |

What is claimed is:

1. A steering wheel pad made of a soft vinyl chloride resin composition comprising:

100 parts by weight of a vinyl chloride resin having an average polymerization degree of 700 to 2500; 20 to 150 parts by weight of a heat treated thermoplastic aliphatic polyurethane; and 60 to 150 parts by weight of an alkyl phthalic ester having the following chemical formula:

wherein m and n are 7 to 9, and said alkyl phthalic ester having a linear chain ratio of an ester group of 80% or more.

2. A steering wheel pad as defined in claim 1, wherein said thermoplastic polyurethane is made of polyester diol and isocyanate.

3. A steering wheel pad as defined in claim 1, wherein the carboxylic acid component of said polyester diol is selected from the group consisting of adipinic acid, succinic acid, azelaic acid, and sebacic acid.

4. A steering wheel pad as defined in claim 1, wherein said thermoplastic polyurethane is an aliphatic thermoplastic polyurethane made of adipinic acid-1.4 butane diol and hexamethylene diisocyanate.

5. A steering wheel pad as defined in claim 1, wherein said vinyl chloride has a tan δ peak temperature of less than −10° C. and is free of bleeding and volatility of the plasticizer.

6. A steering wheel pad as defined in claim 5, wherein said vinyl chloride resin has a tan δ peak temperature of less than −20 C.

7. A steering wheel pad as defined in claim 5, wherein said said vinyl chloride resin has a tensional modulus at 100° C. at least $1.5 \times 10^7$ dyne/cm.

* * * * *